United States Patent [19]

Sirkis

[11] Patent Number: 4,583,669
[45] Date of Patent: Apr. 22, 1986

[54] APPARATUS FOR DETECTING A TAPE SPLICE

[75] Inventor: Michael L. Sirkis, Holland, Pa.

[73] Assignee: Fidelipac Corporation, Moorestown, N.J.

[21] Appl. No.: 603,667

[22] Filed: Apr. 26, 1984

[51] Int. Cl.⁴ ............... B65H 20/02; B65H 26/02
[52] U.S. Cl. ........................... 226/35; 226/45; 360/74.1
[58] Field of Search ............ 226/35, 34, 24, 45, 226/154, 176, 177, 181, 186, 155; 242/188, 186, 209; 360/74.1, 74.5; 361/151

[56] References Cited

U.S. PATENT DOCUMENTS

| | | | |
|---|---|---|---|
| 1,916,845 | 7/1933 | Leland | 226/35 |
| 3,217,996 | 11/1965 | Bernier | 242/188 |
| 3,561,655 | 2/1971 | Yasukawa et al. | 226/35 |
| 3,561,700 | 2/1971 | Adams et al. | 226/35 X |
| 3,643,846 | 2/1972 | Kato et al. | 226/155 X |
| 3,718,269 | 2/1973 | Glaettli | 226/35 X |
| 3,854,643 | 12/1974 | Weaver | 226/35 |
| 3,877,627 | 4/1975 | Boase et al. | 226/35 X |
| 4,142,221 | 2/1979 | Jenkins et al. | 361/151 |
| 4,194,659 | 3/1980 | Birch | 226/35 |
| 4,221,316 | 9/1980 | Jenkins et al. | 226/35 |

*Primary Examiner*—Stanley N. Gilreath
*Attorney, Agent, or Firm*—Weiser & Stapler

[57] ABSTRACT

A splice detection apparatus which operates directly upon the solenoid which is conventionally used to bring the pinch roller into contact with the capstan of a recording/playback unit, eliminating the need for separate levering mechanisms, to detect changes in thickness between spliced and unspliced portions of a tape. Such differences are monitored directly at the solenoid, resulting movement of the plunger of the solenoid developing a change in voltage which is detected by appropriate electronic circuitry to develop a signal which indicates passage of the splice, and appropriately discontinues transport of the tape.

20 Claims, 6 Drawing Figures

APPARATUS FOR DETECTING A TAPE SPLICE

BACKGROUND OF THE INVENTION

The present invention relates generally to magnetic tape recording/playback equipment, and in particular, to an apparatus for detecting splices in such tapes.

Many applications involving the use of magnetic recording tapes give rise to the need to attach or splice respective portions of tape together. In using such tapes to record and play back material, it is generally desirable to avoid placing recorded materials over the splice since irrespective of the quality of the splice, it is not uncommon for discontinuities or drop-outs in the recorded material to occur as the splice passes the magnetic heads of the recording/playback equipment as a result of the discontinuity at the tape surface where the splice has been made.

Although such drop-outs can be extremely annoying in connection with any of a number of magnetic recording applications, this problem is of particular importance in connection with endless loop magnetic recording tape cartridges of the type which are currently in prevalent use in broadcast applications. Such cartridges make use of an endless loop of tape wound within the cartridge so as to enable material recorded on the tape to be repeatedly played in continuous fashion, without the need to rewind the tape. While such tapes are extremely useful in broadcast applications, the structure of the cartridge of necessity requires that at least one tape splice be provided in each cartridge, to develop the endless loop. Moreover, since such cartridges are being used in broadcast applications, the reproduction of drop-outs is unacceptable.

Recognizing this, recordings made using endless loop tape cartridges are preferably initiated just after the tape splice has passed the recording head to maximize the amount of tape which is available to receive the recording before the tape splice is again encountered. While location of the tape splice may be accomplished visually, this is rather difficult and is not acceptable for broadcast applications. Accordingly, the need has arisen to develop a means for automatically detecting the tape splice to "set up" the cartridge for optimized use. Conceptually, this involves equipment which is capable of automatically detecting passage of a tape splice, and stopping transport of the tape at an appropriate time after the splice has been detected so as to make sure that the splice will be located beyond the heads of the recording/playback unit.

One method which has been used to accomplish this is to record a signal on a track of the magnetic recording tape, making sure the recorded signal traverses the splice, and to detect the resulting drop-out as the recorded signal is played back. However, this method is susceptible to error when the splice produced is good in quality, or the test recording is relatively noisy in relation to the quality of the splice.

Another method which has been used to accomplish this result is to optically sense passage of the tape splice. This involves use of a splicing material which is different in color or reflectivity than the magnetic recording tape. Optical sensors are then provided which are capable of sensing passage of the splice by detecting such changes in color or reflectivity. This technique is marginally effective when the tape splice is relatively new. However, after repeated use, film from the tape and grease from the transport mechanism generally tend to discolor the splicing material, causing a deterioration if not a complete loss of the optical differences which are to be sensed, and accordingly compromising the utility of such devices.

Another method which has been used to detect the passage of a tape splice is to mechanically monitor differences in thickness of the tape, signifying passage of the tape splice. However, magnetic recording tapes are generally on the order of 1 mil in thickness, and the splicing material is generally of similar thickness to assure correct transport of the spliced tape through the cartridge. This makes the mechanical detection of a tape splice rather difficult. Generally, mechanical splice detection is accomplished by attaching a lever mechanism to the pinch roller which secures the tape to the capstan of the recording/playback unit so that changes in thickness of the tape passing between the pinch roller and the capstan will cause movement of the lever mechanism. Movement of the lever mechanism may be used to trigger some form of activation switch, such as a mechanical (micro) switch, an optical switch or a magnetic switch, or to produce a current in an associated coil using a moving magnet or the like. Examples of such efforts may be had with reference to U.S. Pat. Nos. 4,142,221 and 3,854,643.

Such efforts have also not proven to be entirely satisfactory. First, such techniques necessitate the attachment of additional and separate mechanical components to the pinch roller assembly of the tape transport mechanism. Such placement adds undesirable weight and structure to the pinch roller assembly which can adversely affect its normal operation. Second, in view of the small changes in thickness which must be detected, extreme precision in adjustment is required to assure correct operation, requiring frequent, tedious calibration procedures.

It therefore remained desirable to develop an apparatus for detecting passage of a tape splice which is reliable in operation, and which does not require the use of ancillary mechanical components requiring extensive calibration and adjustment.

SUMMARY OF THE INVENTION

It is therefore a primary object of the present invention to provide an improved tape splice detector for use in connection with recording/playback equipment.

It is also an object of the present invention to provide a splice detector which is capable of being incorporated into existing recording/playback devices, as well as separate splice finding units.

It is also an object of the present invention to provide a splice detector which operates independently of optics and mechanical levers.

It is also an object of the present invention to provide a splice detector which makes use of existing components of the recording/playback unit in association with electronic detection means requiring a minimum of calibration and adjustment.

It is also an object of the present invention to provide a splice detector which is inexpensive in construction and reliable in use.

These and other objects are achieved in accordance with the present invention by providing a splice detection apparatus which operates directly upon the solenoid which is conventionally used to bring the pinch roller into contact with the capstan of the recording/playback unit to achieve tape transport. Rather than making use of a separate levering mechanism to detect changes in thickness between spliced and unspliced portions of the tape, such differences are monitored directly, at the solenoid. Resulting movement of the plunger of the solenoid, and the change in voltage which such movement develops, is detected by appropriate electronic circuitry to develop a signal which indicates passage of the splice, and appropriately discontinues transport of the tape. Apart from the electronic detection circuitry used, no additional mechanical components are required, and no mechanical calibration is required to maintain correct operation since only changes in movement of the plunger are detected, not measured movement of the plunger in relation to a stationary sensing device.

For further detail regarding a preferred embodiment splice detector in accordance with the present invention, reference is made to the following detailed description, taken in conjunction with the following illustrations.

BRIEF DESCRIPTION OF THE DRAWINGS

In the several views provided, like reference numerals denote similar structure.

DETAILED DESCRIPTION OF THE PREFERRED EMBODIMENT

Figure 1:
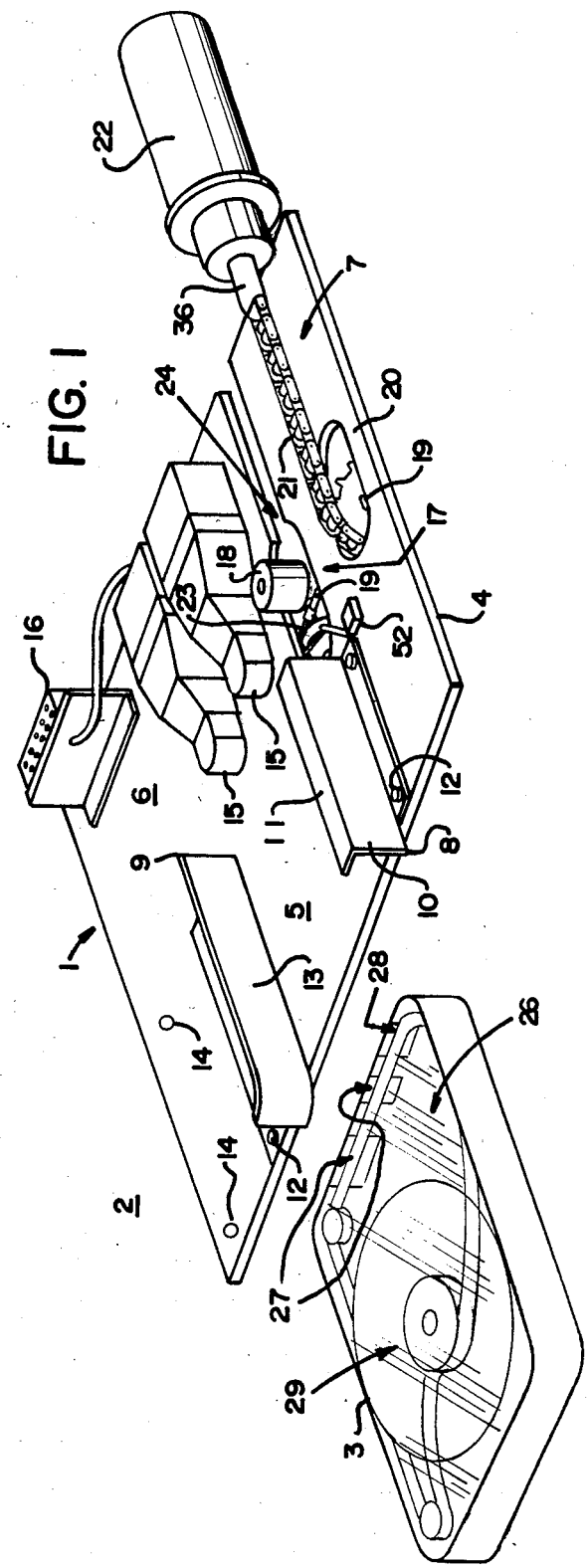
FIG. 1 is an isometric view of the tape transport mechanism of a recording/playback unit incorporating the splice detector of the present invention.

Although specific forms of the invention have been selected for illustration in the drawings, and the following description is drawn in specific terms for the purpose of describing these forms of the invention, this description is not intended to limit the scope of the invention which is defined in the appended claims.

FIG. 1 illustrates the transport mechanism 1 of a recording/playback unit 2 which is adapted for operation in connection with magnetic recording tape cartridges 3 as will be more fully described below. The transport mechanism 1 is provided with a table 4 which is divided into several regions 5, 6, 7, as follows.

A first region 5 of the table 4 is used to receive cartridges 3 within the recording/playback unit 2. In the region 5, the table 4 is essentially solid and planar, and is preferably provided with a pair of brackets 8, 9 for retaining the cartridge 3 in its desired position. A first bracket 8 is positioned at the right of the region 5, and is preferably fixed in position on the table 4 as shown. The bracket 8 preferably includes a first member 10 which extends upwardly from the table 4, and a second member 11 which is essentially parallel to the table 4 and which extends transversely from the upper edge of the member 10 toward the center of the region 5. The height of the bracket 8 is preferably substantially equal to the thickness of the cartridge 3 so that the member 11 can securely engage the cartridge 3 as it enters the region 5. The member 10 serves as an edge guide for the cartridge 3, to properly laterally seat the cartridge 3 in the region 5.

The second bracket 9 is adapted for removable attachment to the table 4 by means of attachment screws 12 so that the guide member 13 is locatable in parallel spaced relation to the member 10 of the bracket 8 at a distance which is appropriate to slidingly receive the cartridge 3 between the brackets 8, 9. This distance is preferably slightly larger than the width of the cartridge 3 to assist in introduction of the cartridge 3 into the region 5, and to assist in its removal, without binding. It will be understood that the bracket 9 is repositionable as desired, such as in the mounting holes 14, to accommodate cartridges of different width. It is even possible, although less desired, to eliminate the bracket 9, using only the bracket 8 to guide the cartridge 3 into its correct position.

The second region 6 of the table 4 receives one or more magnetic heads 15 in spaced relation to the region 5, and to the cartridge 3 which it will ultimately contain. In the embodiment illustrated, a plurality of heads 15 are located in the region 6, presumably to accommodate necessary record/playback/erase functions. Each of the heads 15 are appropriately electrically connectable to the remainder of the recording/playback unit 2 by means of the connector 16. It will, of course, be understood that the composition of the heads 15, as well as their orientation with respect to the region 5, will be appropriately varied to accommodate the type of cartridge 3 which is to be operated upon.

The region 7 of the table 4 receives a capstan/pinch roller mechanism 17 which is useful in engaging the magnetic recording tape of the cartridge 3, once seated in the region 5, to transport the engaged tape in desired fashion. To this end, a capstan 18 is provided which extends upwardly from the table 4 so as to be located in fixed position adjacent to the magnetic recording tape of a cartridge 3 seated within the region 5 of the table 4. An actuation shaft 19 extends beneath the table 4 in transverse fashion as shown, and is journaled for rotation by means of an associated sprocket 20 located at one of its ends. The sprocket 20 is adapted for engagement by a drive chain 21 in operational association with a solenoid 22 so that activation of the solenoid 22 will cause retraction of the drive chain 21, in turn rotating the actuation shaft 19. A pinch roller 23 is associated with the end of the actuation shaft 19 opposite the sprocket 20. Upon rotation of the actuation shaft 19, the pinch roller 23 is capable of being rotated from beneath the table 4, through an aperture 24 provided in the table 4, and into engagement with the capstan 18. In this manner, a magnetic recording tape 25 (FIG. 2) is selectively and securely retained between the pinch roller 23 and the capstan 18, for transport in conventional fashion.

It will be understood that to this point, the various components described are essentially conventional and may form part of any of a number of available recording/playback units. Such components have merely been described to provide an environment in which the apparatus of the present invention may operate, and therefore do not form part of the present invention.

As is also conventional, each cartridge 3 generally takes the form of an enclosure 26, one end of which incorporates apertures 27 for receiving the heads 15 and an aperture 28 for receiving the capstan 18, and which houses an essentially centrally disposed spool 29 for containing an endless loop of the tape 25 for appropriate transport past the apertures 27, 28. It will be understood that the endless loop of tape will, of necessity, incorporate at least one splice which joins together respective ends of the tape 25 to form the continuous loop desired. In accordance with the present invention, a splice detection means 30 is provided which generally comprises detection circuitry in operational association with the solenoid 22 which operates the pinch roller 23.

Figure 3A:
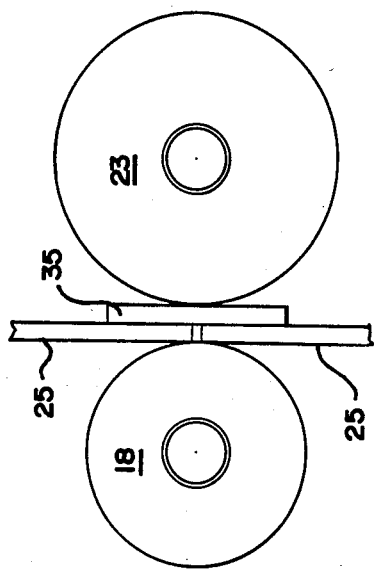
FIG. 3A is a further enlargement of the plan view of FIG. 3 in the vicinity of the capstan and pinch roller.
Figure 3:
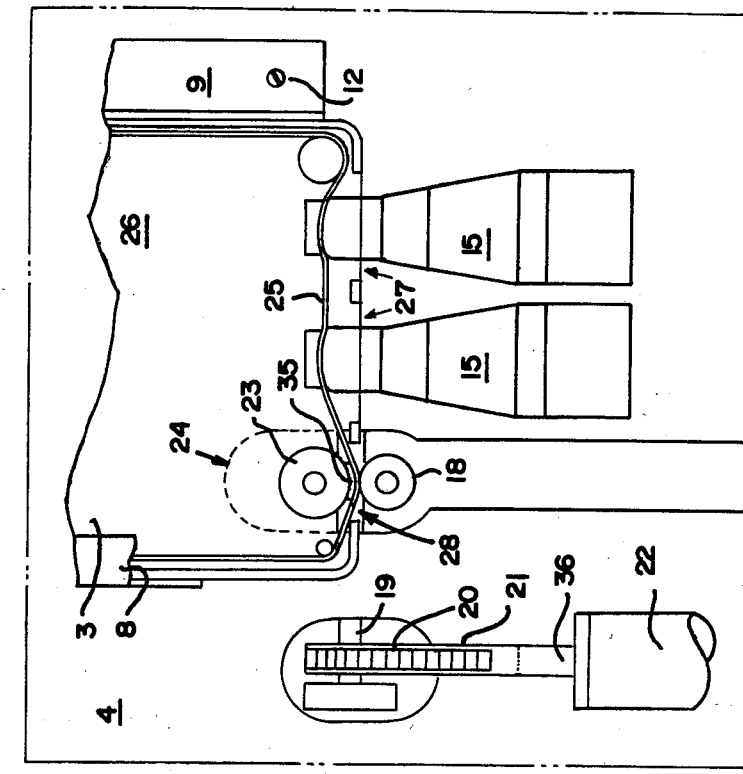
FIG. 3 is an enlarged, plan view of those portions of the tape transport mechanism which are illustrated in FIG. 2, showing passage of a spliced tape between the pinch roller and the capstan.
Figure 2:
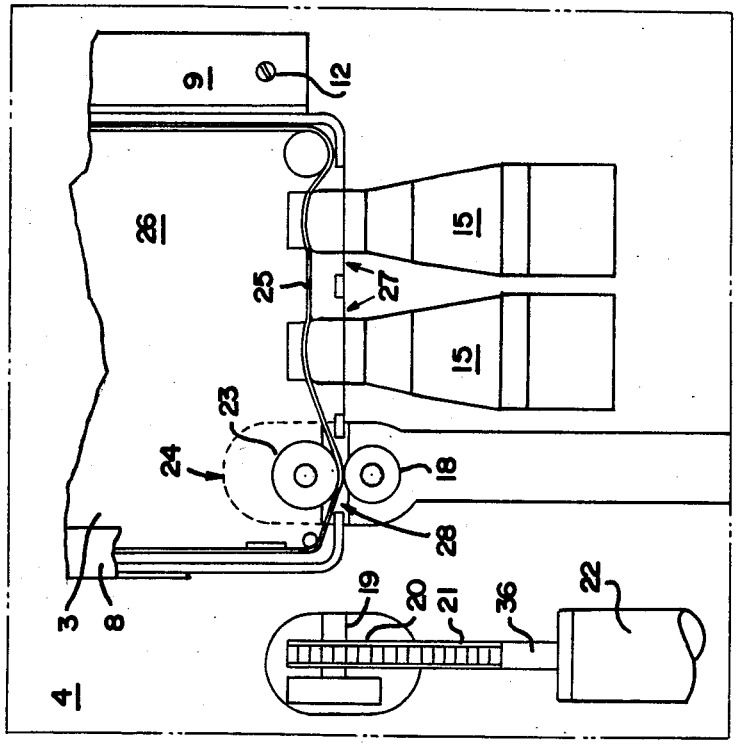
FIG. 2 is an enlarged, plan view of portions of the tape transport mechanism illustrated in FIG. 1, illustrating the capstan and pinch roller assembly in greater detail.

FIGS. 2 and 3 illustrate the mechanical activity which is used to initiate operation of the splice detection means 30 in greater detail. Illustrated is a cartridge 3 which has been seated within the cartridge receiving region 5 of the transport mechanism 1 so that the heads 15 extend through the apertures 27, and so that the capstan 18 extends through the aperture 28 of the cartridge 3. In this manner, the heads 15 and the capstan 18 are brought into contact with the tape 25 which the cartridge 3 contains. It will be noted that the pinch roller 23 has been brought up from beneath the table 4 of the transport mechanism 1, and has been placed in contact with the capstan 18, by means of the solenoid 22. This will in turn cause the drive chain 21 to assume the retracted position illustrated in FIG. 2.

Figure 4:
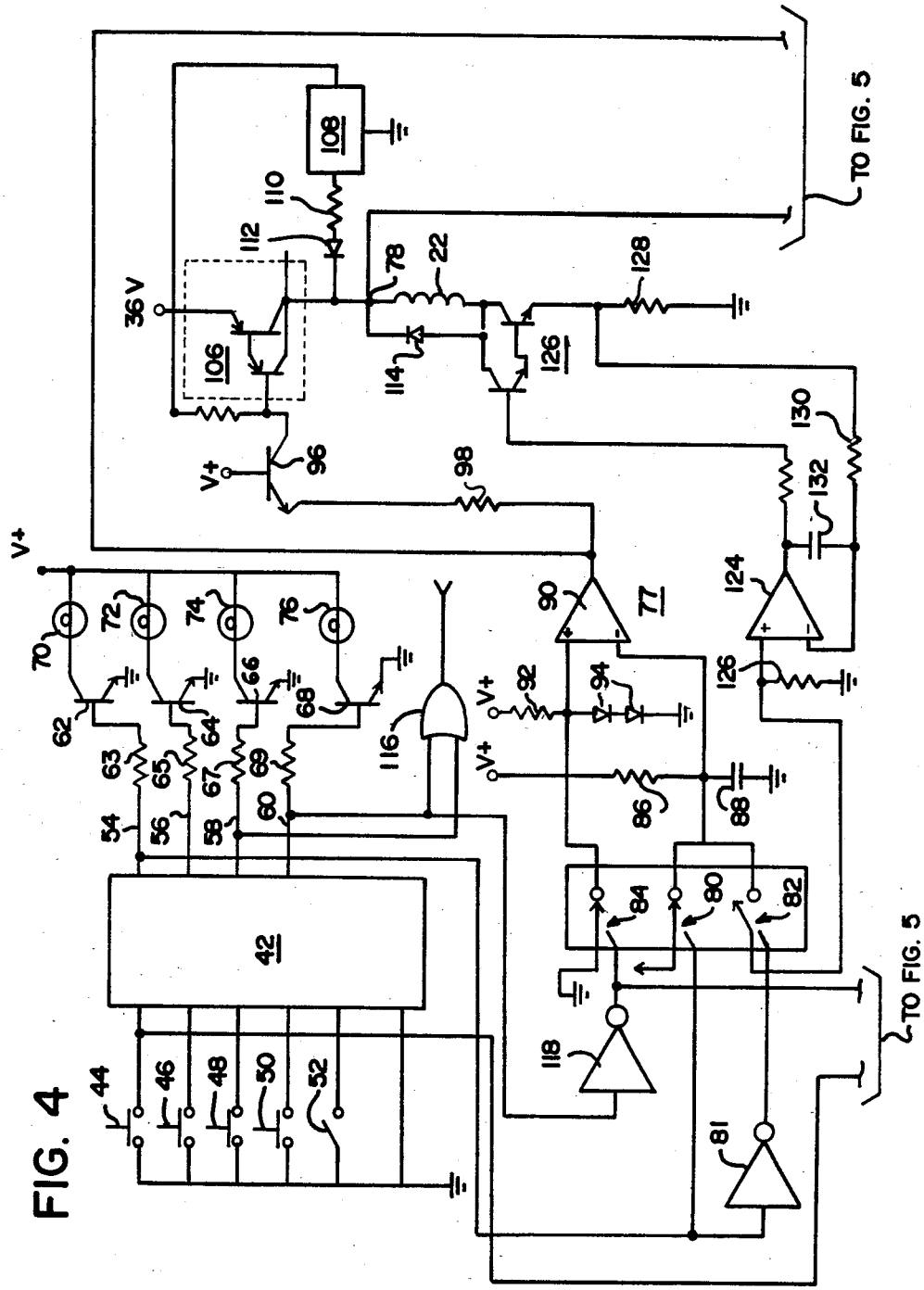
FIG. 4 is a schematic diagram illustrating circuitry for developing changes in voltage at the solenoid which operates the pinch roller assembly illustrated in FIGS. 1–3, upon the passage of a tape splice.
Figure 5:
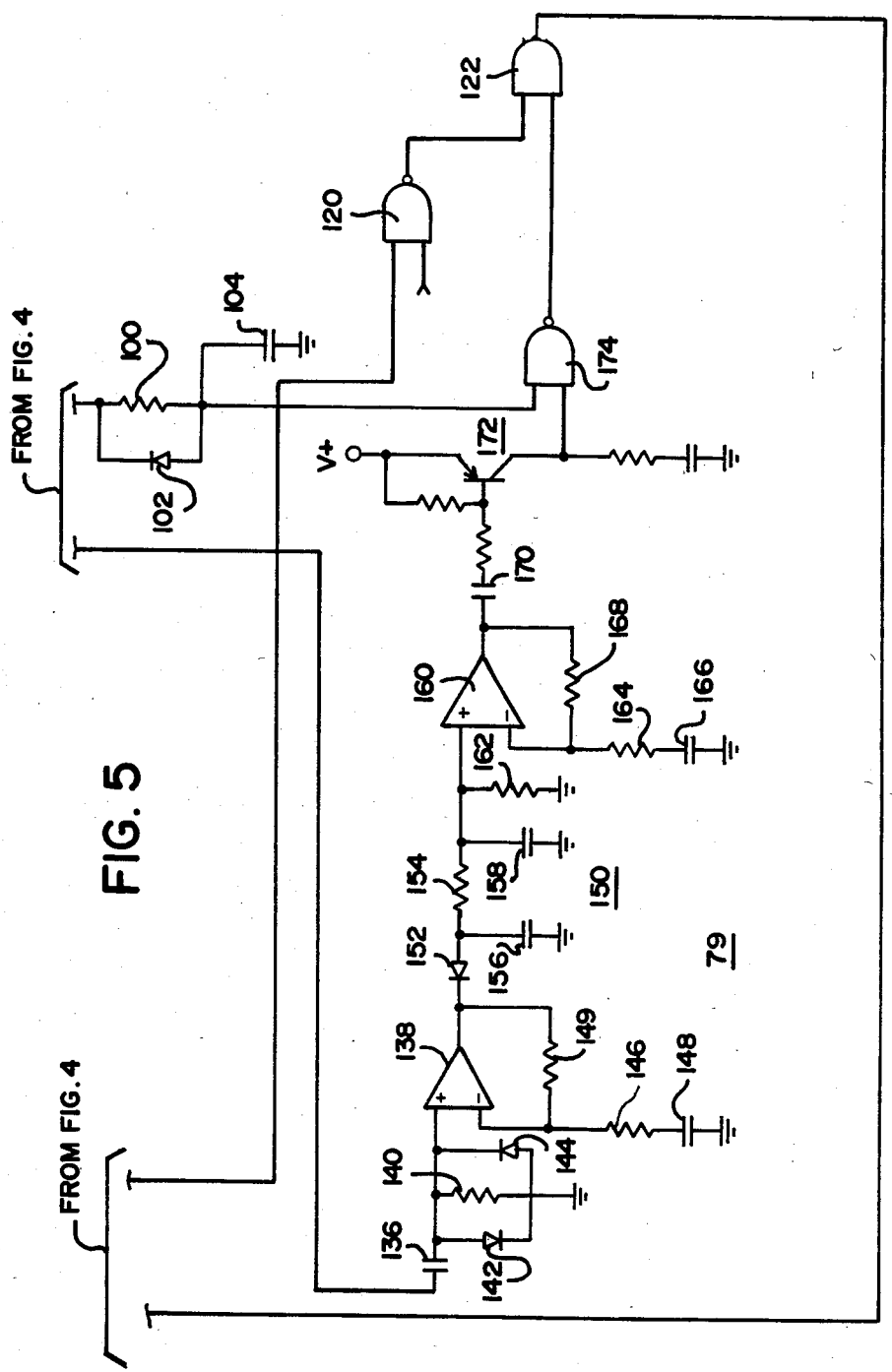
FIG. 5 is a schematic diagram illustrating circuitry for detecting resulting changes in voltage at the solenoid to indicate passage of the tape splice.

Thus, the configuration illustrated in FIG. 2 represents normal operation of the recording/playback unit 2 in transporting a tape 25 in response to rotation of the capstan 18. However, with reference to FIG. 3, it shall now be assumed that in operating the recording/playback unit 2, a splice 35 traverses the interface between the pinch roller 23 and the capstan 18. Since the capstan 18 is fixed in position, this will cause the splice 35 to ride up on the pinch roller 23, deflecting the pinch roller 23 away from the capstan 18 for a distance which is essentially equivalent to the thickness of the tape splice 35 (FIG. 3A). This difference in positioning will accordingly be reflected in a change in angular positioning at the sprocket 20 which will in turn cause retraction of the drive chain 21. Retraction of the drive chain 21 will cause corresponding deflection of the plunger 36 of the solenoid 22 from its normal operating position (as shown in phantom in FIG. 3). Such movement is used to develop a change in potential at the solenoid 22 which is capable of being detected by means of the circuitry 40 illustrated in FIGS. 4 and 5.

Detection circuitry 40 is adapted for interaction with the basic operational controls of the recording/playback unit 2, particularly those portions of the recording/playback unit 2 which are involved in operation of the solenoid 22. Such basic operational functions are carried out by means of appropriate logic circuitry 42 associated with the recording/playback unit 2 and capable of regulating the various functions of the unit in known fashion. For the purposes of the present discussion, various operational controls have been illustrated in association with logic circuitry 42, including a momentary contact switch 44 which is used to develop the "stop" function, a momentary contact switch 46 which is used to develop the "start" function, a momentary contact switch 48 which is used to develop the "fast forward" function, a momentary contact switch 50 which is used to develop the "splice finding" function, and a contact switch 52 which is associated with the tape receiving region 5 of the table 4 so as to cause closure of the contact switch 52 when a cartridge 3 has been seated in the region 5 adjacent the heads 15 and capstan 18. Each of the switches 44, 46, 48, 50, 52 are commonly connected to ground. Thus, closure of any of the switches 44, 46, 48, 50 will ground associated circuitry forming part of the logic circuit 42, developing a desired control function. Switch 52 serves to enable and disable logic circuitry 42, precluding operation of the recording/playback unit 2 until such time as a cartridge 3 has been seated in the tape receiving region 5. For the purposes of the following discussion, it shall be assumed that a cartridge 3 has been suitably positioned for operation, and that the switch 52 is therefore closed.

Before describing operation of the detection circuitry 40, it will be noted that a series of outputs 54, 56, 58, 60 are received from logic circuitry 42 in accordance with activation of the switches 44, 46, 48, 50, respectively. Outputs 54, 56, 58, 60 are respectively coupled to switching transistors 62, 64, 66, 68 by means of resistors 63, 65, 67, 69. The emitters of transistors 62, 64, 66, 68 are each coupled to ground, the collectors each being coupled to a voltage source (V+) by means of lamps 70, 72, 74, 76. Accordingly, the development of a signal at output 54, 56, 58, 60 will cause illumination of the lamp 70, 72, 74, 76, respectively, providing an indication of the operational mode selected.

Detection circuit 40 generally comprises circuitry 77 which interacts with the solenoid 22 to enable changes in voltage to be developed in the solenoid 22, at 78, and circuitry 79 for detecting such changes in voltage.

Turning first to normal modes of operation of the recording/playback unit 2, it shall first be assumed that the recording/playback unit 2 is either to be placed in the stop mode, or is in stop prior to selection of an active mode of operation. In such case, a signal will be provided at 54 which is indicative of the stop mode, either by means of logic circuitry 42 for continued stopping, or by means of switch 44 for a newly initiated stop command. In any event, the signal 54 is applied to the control input of an analog switch 80 coupled to V+, and to an inverter 81 which is in turn coupled to the control input of an analog switch 82. A third analog switch 84, coupled to ground, operates in combination with the analog switches 80, 82 as will be more fully described below.

Contacts of the analog switches 80, 82 are tied together, and are coupled to the inverting input of a comparison circuit 90. The inverting input of comparison circuit 90 is further coupled to V+ by means of resistor 86, and is coupled to ground by a capacitor 88. The contact of analog switch 84 is coupled to the non-inverting input of comparison circuit 90. The non-inverting input of comparison circuit 90 is further coupled to V+ by means of resistor 92, and is coupled to ground by means of a pair of diodes 94.

The output of comparison circuit 90 is coupled to the emitter of switching transistor 96 by means of a resistor 98, and to NAND circuit 174 by means of a resistor 100 and a diode 102 placed in parallel combination and coupled to ground by means of a capacitor 104. The base of switching transistor 96 is coupled to V+. The collector of transistor 96 is coupled to transistor pair 106.

Transistor pair 106 connects a first end 78 of the solenoid 22 to an unregulated power supply which is selected to achieve proper operation of the solenoid 22 (e.g., 36 volts). A diode 114 is placed in parallel with solenoid 22, as is conventional. Placed in parallel with transistor pair 106 is a voltage regulator 108 (No. 7824 or equivalent) in series combination with a resistor 110 and a diode 112. Voltage regulator 108 is adapted to provide a regulated voltage to the solenoid 22 in accordance with biasing of the diode 112. For purposes which will become apparent from description to be provided below, the voltage regulator 108 preferably operates at a level (e.g., 24 volts) which is less than the unregulated voltage level ordinarily applied to the solenoid at 78.

In the event that the transport of magnetic recording tape is to be initiated (record or playback), the start switch 46 is momentarily depressed, providing a signal at 56. Apart from interaction with the transistor 64, no further connections are developed between the signal 56 and the circuit 77 since the presence or absence of a stop signal, as determined by switches 44, 46 in combination with logic circuitry 42, is sufficient to regulate activation of the solenoid 22 as will be more fully described below.

In the event that fast forward operation is called for, momentary depression of the fast forward switch 48 provides a signal at 58, which signal is coupled to a first input of OR circuit 116. The output of OR circuit 116 communicates with a motor speed control circuit (not shown) of the recording/playback unit 2, which develops fast forward operation of the transport system of the recording/playback unit 2 in conventional fashion. Otherwise, no further connections are developed between the signal 58 and the circuit 77 since the solenoid 22 is to remain activated in fast forward, and this function is already capable of being provided by means of the start function.

Lastly, in the event that the splice finding function is to be called upon, switch 50 is momentarily depressed, providing a signal at 60 which is further coupled to the remainder of the circuit 77 as follows. First, signal 60 is coupled to the second input of OR circuit 116. This signals the motor speed control circuit that fast forward operation is to be initiated, since splice finding is generally preferably accomplished in fast forward. Second, the signal 60 is coupled to an inverter 118, the output of which is coupled to the control input of analog switch 84, and to the first input of a two input NAND circuit 120. The second input of NAND circuit 120 is received from circuitry which senses stop tones associated with the cue track of a recording in play, as is conventional, for purposes which will be described more fully below. The output of NAND circuit 120 is coupled to the first input of a two input AND circuit 122.

It will be noted that analog switch 82 is coupled to the non-inverting input of a comparison circuit 124, and is further coupled to ground by means of resistor 126. The output of comparison circuit 124 is applied to transistor pair 126, which couples the solenoid 22 to ground by means of resistor 128. The inverting input of comparison circuit 124 is received from the connection between transistor pair 126 and resistor 128 by means of a resistor 130, and is connected to the output of comparison circuit 124 by means of a capacitor 132.

Detection circuitry 79 takes its input from the solenoid 22, at 78. This input is capacitively coupled (capacitor 136) to the non-inverting input of an amplifier 138.

The non-inverting input of amplifier 138 is coupled to ground by means of a resistor 140 and a pair of diodes 142, 144, as shown. The inverting input of amplifier 138 is coupled to ground by means of a resistor 146 and a capacitor 148 placed in series combination. A resistor 149 couples the output of amplifier 138 to its inverting input.

The output of amplifier 138 is coupled to a filtering network 150 by means of a rectifying diode 152. Filtering network 150 comprises a resistor 154 separating capacitors 156, 158 coupled to ground.

The output of filtering network 150 is applied to the non-inverting input of a second amplifier 160. The non-inverting input of amplifier 160 is further coupled to ground by means of a resistor 162. The inverting input of amplifier 160 is coupled to ground by means of a resistor 164 and a capacitor 166 in series combination. A resistor 168 couples the output of amplifier 160 to its inverting input.

The output of amplifier 160 is capacitively coupled (capacitor 170) to a switching network comprising an appropriately biased switching transistor 172, the collector of which provides the second input to NAND circuit 174. The output of NAND circuit 174 provides the second input to AND circuit 122. The output of AND circuit 122 is connected to the input of logic circuitry 42 which is associated with the stopping function.

In operation, it shall first be assumed that the recording/playback unit is either in its quiescent condition, or is to be stopped. In either case, a signal will be developed at 54 which charges capacitor 88 by means of analog switch 80. This drives the inverting input of comparison circuit 90 to V+. The non-inverting input of comparison circuit 90 is driven to ground by means of the analog switch 84. Comparison circuit 90 is accordingly driven low, turning on transistors 96, 106. This will cause the unregulated supply voltage to be applied to the solenoid 22. Since this will also result in reverse biasing of the diode 112, voltage regulator 108 will be essentially removed from the circuit at this stage of operation.

Also in this mode, the non-inverting input of comparison circuit 124 will be coupled to ground by means of resistor 126. This will drive comparison circuit 124 low, switching transistor pair 126 off, and precluding the flow of current through the solenoid 22. Thus, the solenoid 22 will remain deactivated in the stop mode, as is desired.

Let it now be assumed that it is desired to operate the recording/playback unit 2 at a normal transport speed, to develop a recording or playback function. This is accomplished by momentarily depressing switch 46, resulting in the development of a signal at 56, and removal of the signal previously developed at 54. This transition will turn the lamp 72 on and the lamp 70 off, and will cause analog switch 80 to open and analog switch 82 to close. Operation of the comparison circuit 90 will continue to maintain the transistor pair 106 on, again placing the unregulated supply voltage on the solenoid 22. However, transition in state of the switches 80, 82 will cause the voltage developed at capacitor 88 to be placed on the non-inverting input of comparison circuit 124. Since comparison circuit 124 will attempt to drive its inverting and non-inverting inputs to equilibrium, the output of comparison circuit 124 will go high, switching the transistor pair 126 on and energizing the solenoid 22.

As a result, a voltage will be developed across resistor 128 which is representative of the current flowing through the solenoid 22. This potential is sensed at the inverting input of comparison circuit 124. Initially, a large difference in potential will be developed between the inverting and non-inverting inputs of comparison circuit 124, turning the transistor pair 126 on hard. However, as capacitor 88 discharges through resistor 126, comparison circuit 124 will be driven toward a state of equilibrium which will result in the application of reduced currents to the solenoid 22. Thus, the solenoid 22 will be provided with an initial surge of current to assure its closure, but will eventually be operated at a relatively low, constant current so as to efficiently maintain closure.

Of course, in the event that it is desired to return to a stop condition, the circuitry described above will revert to its original condition, preventing the passage of current through the solenoid 22. Alternatively, in the event that it is desired to enter a fast forward mode, the switch 48 is momentarily depressed, developing a signal at 58. The signal developed at 58 will cause illumination of the lamp 74, and will also be applied to OR circuit 116, which will in turn signal the motor speed control means to initiate fast forward operation in conventional fashion. In such case, logic circuitry 42 will also develop a signal at 56 so that the solenoid 22 will be activated similarly as described in connection with the start mode.

It shall now be assumed that its desired to initiate splice finding. This is accomplished by momentarily depressing the switch 50, which will in turn develop a signal at 60. The signal at 60 will cause activation of the lamp 76, and will be applied to OR circuit 116 to instruct the motor speed control means to develop a fast forward operation in search of a splice, as is preferred. Additionally, the signal 60 will open the analog switch 84. As a result, a nominal voltage of 1.2 volts will be placed on the non-inverting input of comparison circuit 90. Initially, the voltage level developed by charged capacitor 88 will cause the output of comparison circuit 90 to remain low, maintaining the application of voltage to the solenoid 22 as previously described to initially actuate the solenoid 22. However, the voltage developed on the capacitor 88 will eventually decay below the 1.2 volts maintained at the non-inverting input of comparison circuit 90, driving the output of comparison circuit 90 high and turning transistors 96, 106 off. This will disconnect the unregulated voltage supply from the solenoid 22 and will cause forward biasing of the diode 112, applying a regulated voltage to the solenoid 22 by means of the voltage regulator 108, in series combination with the resistor 110.

As a result of this change in state, the current passing through the solenoid 22 will decrease since the voltage supplied by the regulated source 108 is less than the unregulated voltage originally supplied. Comparison circuit 124 will sense this reduction in current at resistor 128, switching the transistor pair 126 on hard. This will disable the previously discussed constant current mode of operation so that movement of the plunger 36 within the solenoid 22 will induce a change in voltage across the solenoid 22 which is capable of being detected at 78 by virtue of the increased impedance which is developed by means of resistor 110.

Changes in voltage sensed at 78 are in turn amplified by amplifier 138. Ultimate signal detection is accomplished by means of rectification (diode 152) and noise filtering (filter 150), any detected pulses being amplified by means of amplifier 160. Filter 150 also introduces a slight time delay to the detected pulse to make sure that the splice has fully passed the capstan 18 before stopping. Transistor 172 serves to invert the detected signal for presentation to NAND circuit 174.

When the recording/playback unit is first placed in the splice finding mode, capacitor 104 will be discharged through the diode 102 and the comparison circuit 90. When comparison circuit 90 is first driven high, capacitor 104 will be charged through resistor 100. Accordingly, NAND circuit 174 will inhibit the passage of detected splice pulses until such time as capacitor 104 has become charged. This is to prevent stopping of the recording/playback unit 2 as a result of false pulses generated when the solenoid 22 is first energized, resulting either from transients in the system due to the capstan motor or the solenoid, or a splice which is partially located between the capstan and pinch roller upon the initiation of system operation. NAND circuit 174 also operates to prevent placing the recording/playback unit 2 in a stop mode unless the splice finding mode has been called into play.

However, when the splice finding mode has been called into play, and when, following activation of the solenoid 22, a detected pulse is processed by means of transistor 172, the output of NAND circuit 174 will be driven low. If enabled by NAND circuit 120, this change in state will cause the output of AND circuit 122 to go low, signifying that a splice has been located and causing the recording/playback unit 2 to stop by driving the stop terminal of logic circuitry 42 low.

It is to be noted that NAND circuit 120 receives an input from inverter 118, to indicate initiation of a splice finding operation, and an input which proceeds in accordance with detection of a stop tone associated with a recorded cue track in conventional fashion, to stop the recording/playback unit 2 by means of AND circuit 122. NAND circuit 120 serves to inhibit stop tones during splice finding so that the only occurrence which will automatically stop transport of the magnetic recording tape will be the detection of a splice, and not the detection of a stop tone.

It will therefore be seen that the foregoing serves well to satisfy each of the objectives previously set forth. It will also be understood that the foregoing will be capable of variation without departing from the spirit and scope of the present invention.

For example, the manner in which the regulated voltage source 108 is applied to the solenoid 22 may be varied, provided a sufficient differential is provided to withdraw the solenoid 22 from its constant current mode of operation for subsequent detection operations to be enabled. Also capable of variation is the element or elements used to develop an impedance in conjunction with the regulated voltage source 108 for the detection of changes in voltage across the solenoid 22. The foregoing description makes use of a resistor 110 to provide this function, however, it is also possible to use other impedance producing elements if desired. Also capable of variation are specifics of the circuitry which comprises the detection circuit 40, as well as the selective controls which are used to either produce or inhibit the various signals discussed above. Lastly, although the foregoing has been described in terms of splice finding in combination with magnetic tape recording/playback equipment, it will be understood that the present invention will also find utility apart from splice finding, in the detection of attached marker tapes, or in conjunction with other types of tapes, or in conjunction with other types of tape handling equipment, including discrete splice finding units, or erase/splice finding units, and others.

It will therefore be understood that various changes in the details, materials and arrangement of parts which have been herein described and illustrated in order to explain the nature of this invention may be made by those skilled in the art within the principle and scope of the invention as expressed in the following claims.

What is claimed is:

1. In combination with means for transporting a tape, said tape having portions which are thickened in relation to the remainder of said tape, and said transporting means comprising fixed, rotatable capstan means and pinch roller means movable from a retracted position to a position which engages said tape between said capstan means and said pinch roller means, means for detecting passage of said thickened portions of said tape between said capstan means and said pinch roller means, comprising:

pinch roller means including an actuation shaft journaled for rotation with respect to said transporting means, one end of which includes a pinch roller and the other end of which includes drive means in operational association with a solenoid;

means for applying, in combination, an impedence and a reference voltage to said solenoid in a detecting mode, wherein said reference voltage is capable of maintaining said solenoid in an activated position wherein said pinch roller means engages said tape between said capstan means and said pinch roller, and so that movement of said drive means will cause a differential in voltage to be developed in said solenoid;

means for sensing said differential in voltage, in operational association with said solenoid; and means for stopping transport of said tape in response to a detected differential in voltage, in operational association with said detecting means; so that in said detecting mode, passage of said thickened portions of said tape between said capstan means and said pinch roller causes movement of said drive means, developing a differential in voltage in said solenoid which is detected by said detecting means, stopping said transporting means.

2. The combination of claim 1 wherein said thickened portions of said tape are a marker tape joined to portions of said tape.

3. The combination of claim 2 wherein said marker tape is a splicing material for joining portions of said tape end to end.

4. The combination of claim 1 wherein said reference voltage is regulated.

5. The combination of claim 4 wherein said impedence is a resistance.

6. The combination of claim 1 wherein said reference voltage and said impedence are in series combination.

7. The combination of claim 1 which further comprises means for applying an operating voltage to said solenoid, to activate said solenoid in operative modes other than said detecting mode.

8. The combination of claim 7 wherein said operating voltage is greater than said reference voltage.

9. The combination of claim 8 wherein said reference voltage is essentially removed from said solenoid unless said transporting means is operating in said detecting mode.

10. The combination of claim 9 which further comprises switching means for replacing said operating voltage with said reference voltage in said detecting mode.

11. The combination of claim 10 which further comprises current control means in operational association with said solenoid so that application of said operating voltage to said solenoid produces an essentially constant current through said solenoid, and so that application of said reference voltage to said solenoid disables said constant current producing means.

12. The combination of claim 1 wherein said differential in voltage is developed in accordance with relative differentials in respective positioning of the drive means and the solenoid which are independent of a fixed reference.

13. The combination of claim 12 wherein said solenoid incorporates an activating plunger, and wherein movement of said drive means responsive to movement of said pinch roller means causes corresponding movement of said plunger with respect to said solenoid.

14. The combination of claim 13 wherein said drive means is a drive chain, one end of which engages the plunger of said solenoid, and the other end of which engages sprocket means associated with the actuation shaft of said pinch roller means.

15. The combination of claim 1 wherein said sensing means includes means for rectifying said differential in voltage, and means for filtering said rectified differential in voltage.

16. The combination of claim 1 wherein said thickened portions have a length, and wherein said sensing means incorporates delay means for stopping transport of said tape at a predetermined time after said thickened portions pass said capstan means and said pinch roller.

17. The combination of claim 1 wherein said transporting means forms part of a recording/playback unit for use in connection with magnetic recording tapes.

18. The combination of claim 1 wherein said transporting means forms part of a discrete splice finding unit.

19. The combination of claim 1 wherein the only operational cooperation developed between the pinch roller means and the detecting means is at the solenoid.

20. In combination with means for transporting a tape, said tape having portions which are secured end to end by means of a splicing material, and said transporting means comprising fixed, rotatable capstan means and pinch roller means movable from a retracted position to a position which engages said tape between said capstan means and said pinch roller means, means for detecting passage of said splicing material between said capstan means and said pinch roller means, comprising:

pinch roller means including an actuation shaft journaled for rotation with respect to said transporting means, one end of which includes a pinch roller and the other end of which includes drive means in operational association with a solenoid;

means for applying a first voltage to said solenoid, to activate said solenoid so that said drive means is retracted, thereby rotating said pinch roller so as to engage said tape between said capstan means and said pinch roller;

switching means for applying, in combination, an impedence and a second voltage different from said first voltage to said solenoid in a detecting mode, wherein said second voltage is capable of maintaining said solenoid in said actuated position, and so that movement of said drive means will cause a differential in voltage to be developed in said solenoid;

means for sensing said differential in voltage, in operational association with said solenoid; and means for stopping transport of said tape in response to a detected differential in voltage, in operational association with said detecting means; so that in said detecting mode, passage of said thickened portions of said tape between said capstan means and said pinch roller causes movement of said drive means, developing a differential in voltage in said solenoid which is detected by said detecting means, stopping said transporting means.

* * * * *